April 27, 1965     B. GLYNN     3,179,969
AUTOMOBILE WINDSHIELD WIPER BACKING MEMBERS
Filed Oct. 4, 1963
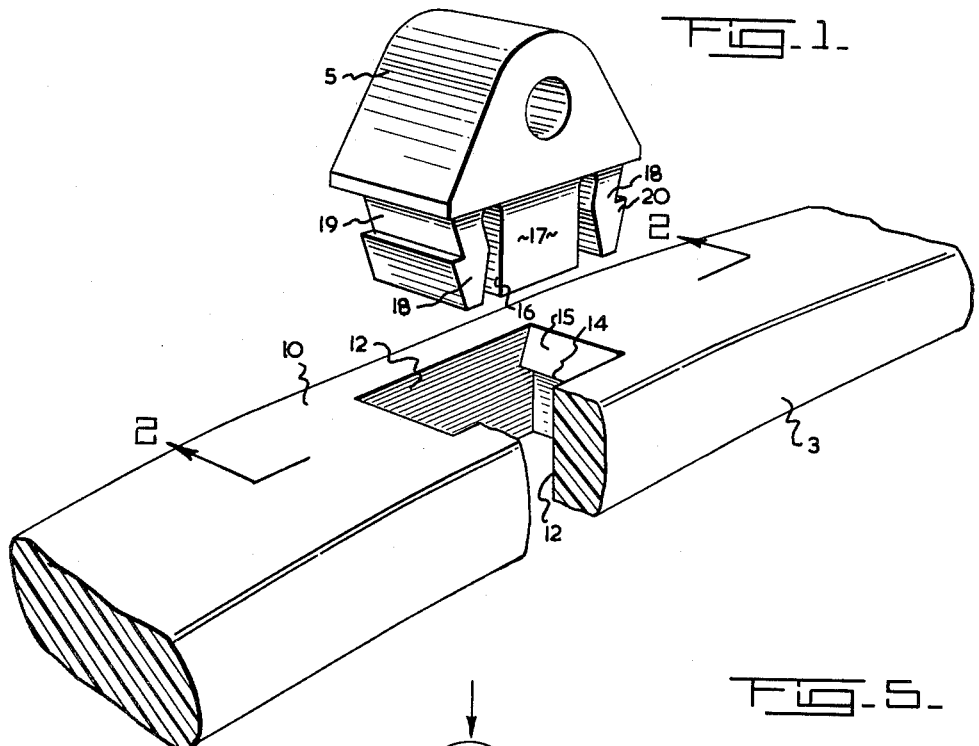
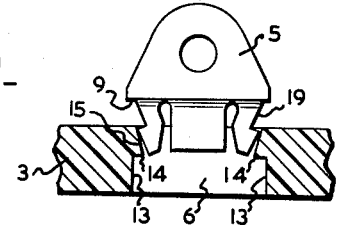
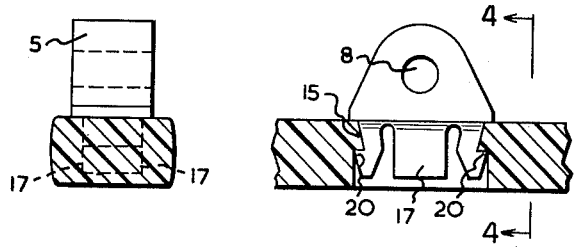
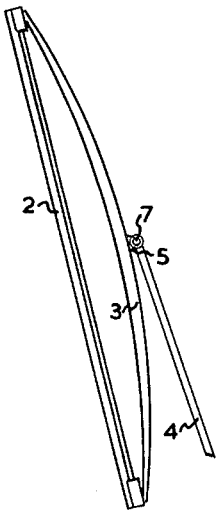
INVENTOR
BRIAN GLYNN
ATTYS.

United States Patent Office 3,179,969
Patented Apr. 27, 1965

3,179,969
AUTOMOBILE WINDSHIELD WIPER
BACKING MEMBERS
Brian Glynn, Dundas, Ontario, Canada, assignor to Tridon
Manufacturing Limited, Ontario, Canada
Filed Oct. 4, 1963, Ser. No. 313,910
7 Claims. (Cl. 15—250.32)

This invention relates to improvements in automobile windshield wiper pressure members of the type wherein the wiper pressure member is preferably formed of moulded plastic material, such as disclosed in my patent application "Windshield Cleaners," Serial No. 287,573, filed June 13, 1963.

While in practice of the foregoing invention it is possible to produce moulded plastic windshield wiper pressure members having integral pierced lugs protruding therefrom for attachment to windshield wiper supporting arms, the cost of providing a variety of complicated moulds for production of such pressure members of various required lengths is very high as compared to production of simply moulded plastic pressure members not having protruding lugs and to which the lugs are afterwards attached.

The object of this invention is therefore to provide a novel pressure member supporting lug element insertable into and lockable within a slot in the pressure member, the lug element being provided for attachment to a windshield wiper supporting arm.

A particular object of the invention is to form the lug element with an anchoring assembly comprising a pair of resilient prongs and a plug positioned between the prongs, the prongs and plug projecting from one face of the lug for insertion into the slot, the prongs carrying teeth for interlocking engagement with teeth projecting from walls of the slot and the plug so dimensioned as to be tightly receivable within the slot.

A further object of the invention is to furnish the lug, prongs and plug in integral solid form.

With the foregoing and other objects in view as shall hereinafter appear, the invention consists of a windshield wiper pressure member supporting lug formed and arranged all as hereinafter more particularly described and illustrated in the accompanying drawing, in which:

FIG. 1 is an exploded fragmentary perspective view of the slot containing portion of a windshield wiper pressure member and the member supporting lug element.

FIG. 2 is a reduced sectional view through the pressure member being taken along the line 2—2, FIG. 1 and showing the lug element positioned for insertion into the pressure member slot.

FIG. 3 is a similar view to FIG. 2 and showing the lug element inserted in place within the slot.

FIG. 4 is a cross-sectional view through the pressure member, taken through the line 4—4, FIG. 3, and FIG. 5 is a reduced side view of one of the known types of windshield wiper assemblies and showing the pressure member provided with the lug element which is attached to a windshield wiper supporting arm.

Referring to FIG. 5, the standard type automobile windshield wiper is mounted for oscillating movement and comprises a windshield engaging squeegee element 2 suitably mounted upon a pressure member 3 which is pivotally mounted upon the outer end of an oscillatable windshield wiper supporting arm 4. This invention relates to the provision of a novel lug element 5 insertable into a novel slot 6 in the pressure member and to which lug the windshield wiper supporting arm 4 is attached in any suitable manner, such as by a pin 7 carried by the arm to extend through an orifice 8 pierced through the lug.

Referring to the other figures of the drawing, the lug 5 is preferably a solid formed of moulded plastic material, as is preferably the pressure member 3, the material being such that when in attenuated form it possesses resilient characteristics. The front face 9 of the lug 5 is dimensioned to overlie the portion of the rear face 10 of the pressure member 3 which is contiguous to the slot 6, when the lug is attached to the pressure member.

The front face 9 of the lug is preferably of rectangular shape, as is the slot 6, the slot also preferably extending through the pressure member and having a pair of parallel side walls 12 and a pair of parallel end walls 13. The end walls 13 carry a pair of similar angular teeth 14 having downwardly inclined faces 15 of lesser length than the depth of the slot and extending from the vicinity of the rear face 10 of the pressure member, the crowns of the teeth being positioned intermediately of the depth of the slot.

The front face 9 of the lug 5 carries an integral centrally positioned plug 16 protruding therefrom for insertion into the slot, the plug having parallel sides 17 spaced apart a distance substantially equivalent to the distance between the sides 12 of the slot whereby the plug is a relatively tight fit within the slot. A pair of prongs 18, integral with the lug, also protrude from the front face 9 of the lug for insertion into the slot, the prongs being resilient and positioned upon either side of the plug in spaced relation thereto, and also being of such a width that they are a relatively close fit between the side walls 12 of the slot. The outer remote similar sides of the prongs are formed with downwardly and inwardly inclined faces 19 of substantially the same inclination and size as the faces 15 of the slot teeth 14 and against which they press upon complete insertion of the prongs into the slot. The lower ends of the prong faces 19 terminate in teeth 20 adapted to underlie the teeth 14 projecting from the rear end walls of the slot and so retain the lug against outward movement from the slot.

To insert the lug into the slot it is merely necessary to place the lug in position shown in FIG. 2 with its prongs and plug partly inserted into the slot and from which position downward movement of the plug under pressure causes the prongs 18 to be squeezed towards one another against their inherent resiliency as they slide past the faces 15 of the slot teeth 14. Upon passage of the prong teeth 20 past the slot teeth faces 15, the prongs spring apart into locking position shown in FIG. 3. As the plug 17 and prongs 18 are a close fit between the side walls of the slot and as the faces 19 of the inserted prongs press flatly against the faces 15 of the slot teeth, it will be appreciated that in conjunction with the front face 9 of the lug being seated upon the rear face 10 of the pressure member that a rigid and rattle free assembly is provided.

What I claim as my invention is:

1. Means for attaching a windshield wiper pressure member to a windshield wiper supporting arm and comprising the provision of a slot in the pressure member, the slot having opposite end walls and extending inwardly from the rear face of the member intermediately of the length of said face, a pair of oppositely positioned teeth projecting from the two end walls of the slot, crowns formed upon the teeth and located intermediately of the depth of the slot, a lug attachable to the windshield wiper supporting arm and having a front face adapted to overlie the portion of the rear face of the pressure member contiguous to the slot, a pair of resilient prongs of substantially the same width as the width of the slot and carried by the lug and protruding outwardly of said front face of the lug for insertion into said slot, said prongs being squeezable towards each other against their resiliency, the prongs having outer remote similar sides arranged to extend in juxtaposition to the said opposite end walls of the slot, and teeth projecting from said outer sides of the prongs and positioned to underlie the teeth projecting from the opposite side walls of the slot and to press against said side walls upon insertion of the prongs into the slot.

2. Means for attaching a windshield wiper pressure member to a windshield wiper supporting arm as defined in claim 1, wherein the side walls of the slot are straight and parallel and the teeth of the prongs of substantially the same width as the distance between the side walls of the slot, the crowns of the teeth projecting from said end walls of the slot being of angular form and each having an outwardly inclined face extending inwardly of the slot from the vicinity of the front face of the lug.

3. Means for attaching a windshield wiper pressure member to a windshield wiper supporting arm as defined in claim 2, wherein the remote opposite sides of the prongs have faces which are inclined downwardly and inwardly towards each other, said faces being adapted to seat against the inclined faces of the teeth projecting from the end walls of the slot, the teeth on the prongs being positioned upon the prongs to underlie the crowns of the teeth projecting from the end walls of the slot and to press against the end walls of the slot under resilient pressure of the squeezed together prongs.

4. Means for attaching a windshield wiper pressure member to a windshield wiper supporting arm and comprising the provision of a rectangular slot extending into the pressure member from the rear face of the pressure member, the slot having flat parallel side walls and flat parallel end walls, a pair of angular teeth projecting from the outer portions of the end walls of the slot, a lug attachable to the windshield wiper supporting arm, a plug having flat opposite sides and protruding from the lug for insertion into the slot, the thickness of the plug between its flat sides being substantially equivalent to the distance between the flat side walls of the slot to provide a relatively tight fit of the plug within the slot, a pair of resilient spaced apart prongs carried by the lug also for insertion into the slot and between which prongs the plug is positioned, said prongs being squeezable towards the plug against their resiliency, the prongs having outer remote similar faces arranged to extend in juxtaposition to said parallel end walls of the slot, and teeth formed upon said outer faces of the prongs and positioned to underlie the teeth projecting from the end walls of the slot upon insertion of the prongs into the slot.

5. Means for attaching a windshield wiper pressure member to a windshield wiper supporting arm as defined in claim 4, wherein the teeth projecting from the end walls of the slot have downwardly inclined faces extending from the vicinity of the rear face of the pressure member and which are of lesser length than the depth of the slot, and inclined surfaces constituting portions of the remote similar sides of the prongs and adapted to press against the inclined surfaces of the teeth projecting from the end walls of the slot under resilient urge of the prongs upon insertion of the prongs into the slot.

6. A connector for connecting together an elongated windshield wiper pressure member and a windshield wiper supporting arm comprising, the provision of a slot in the pressure member, the slot having opposite end walls extending transversely of the direction of elongation of the pressure member, and extending inwardly from the rear face of the pressure member intermediately of the length of the said rear face, a pair of oppositely positioned teeth projecting from the two end walls of the slot and located intermediately of the depth of the slot, crowns formed upon the teeth and constituted respectively by the junction between a first end wall portion between the said rear face and the crown and a second intermediate wall portion, the said first end wall portions extending progressively inwardly towards one another in the direction from the said rear face to the teeth crown, and the said second end wall portions extending substantially parallel to the said rear face, a lug attachable to the windshield wiper supporting arm and having a front face adapted to overlie the portion of the rear face of the pressure member contiguous to the slot, a pair of resilient prongs of substantially the same width as the width of the slot and carried by the lug and protruding outwardly of the said front face of the lug for insertion in to the slot, said prongs being squeezable towards each other against their resiliency, the prongs having outer remote similar sides arranged to extend in juxtaposition to the said opposite end walls of the slot, a pair of teeth projecting respectively from said similar sides, and crowns on the teeth positioned to underlie the teeth projecting from the opposite side walls of the slot upon full insertion of the prongs into the slot, said similar sides being constituted respectively by a first portion between the lug and the tooth of the crown extending downwardly and progressively inwardly to seat against the first end wall portion, a second intermediate portion extending substantially parallel to the said lug front face to underlie and seat against the said second end wall portion, and a third portion having its junction with the said second portion forming the said crown and extending downwardly and progressively inwardly to engage the said first end wall portion as the prongs are inserted in the slot for facilitating the squeezing of the prongs towards each other.

7. A connector for connecting together an elongated widshield wiper pressure member and a windshield wiper supporting arm comprising, the provision of a slot in the pressure member, the slot having opposite end walls extending transversely of the direction of the elongation of the pressure member and extending inwardly from the rear face of the pressure member intermediately of the length of the said rear face, a pair of oppositely positioned teeth projecting from the two end walls of the slot and located intermediately of the depth of the slot, crowns formed upon the teeth and constituted respectively by the junction between the first end wall portion between the said rear face and the crown and a second intermediate wall portion, the said first end wall portions extending progressively inwardly towards one another in the direction from the said rear face to the teeth crowns, and the said second end wall portions extending substantially parallel to the said rear face, a lug attachable to the windshield wiper supporting arm and having a front face adapted to overlie the portion of the rear face of the pressure member contiguous to the slot, a plug having flat opposite sides and protruding from the said front face of the lug for insertion into the slot, the thickness of the lug between its flat sides being substantially equivalent to the distance between the flat side walls of the slot to provide a relatively tight fit of the plug within the slot, a pair of resilient prongs of substantially the same width as the width of slot, carried by the lug and protruding outwardly of the said front face of the lug for insertion into the slot, said prongs being squeezable towards each other against their resiliency, the prongs having outer remote similar sides arranged to extend in juxtaposition to the said opposite end walls of the slot, a pair of teeth projecting respectively from said similar sides, and crowns on the teeth positioned to underlie the teeth projecting from the opposite side walls of the slot upon full insertion of the prongs in the slot, said similar sides being constituted respectively by a first portion between the lug and the tooth crown extending downwardly and progressively inwardly to seat against the said first end wall portion, a second intermediate portion extending substantially parallel to the said lug front face to underlie and seat against the said second end wall portion, and a third portion having its junction with the said second portion forming the said crown and extending downwardly and progressively inwardly to engage the said first end wall portion as the prongs are inserted in the slot for facilitating the squeezing of the prongs towards each other.

References Cited by the Examiner

UNITED STATES PATENTS

| 2,508,056 | 5/50 | Zaiger | 15—250.32 |
| 2,581,103 | 1/52 | Horton | 15—250.32 |

FOREIGN PATENTS

| 130,772 | 5/02 | Germany. |
| 1,090,122 | 9/60 | Germany. |
| 1,126,016 | 7/56 | France. |

CHARLES A. WILLMUTH, *Primary Examiner.*